(12) United States Patent
Cheng

(10) Patent No.: US 11,449,044 B2
(45) Date of Patent: Sep. 20, 2022

(54) SUCCESSIVE MAXIMUM ERROR REDUCTION

(71) Applicant: EMERSON PROCESS MANAGEMENT POWER & WATER SOLUTIONS, INC., Pittsburgh, PA (US)

(72) Inventor: Xu Cheng, Pittsburgh, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 86 days.

(21) Appl. No.: 16/851,449

(22) Filed: Apr. 17, 2020

(65) Prior Publication Data

US 2021/0325835 A1    Oct. 21, 2021

(51) Int. Cl.
*G05B 23/02*    (2006.01)
*G06V 30/194*    (2022.01)

(52) U.S. Cl.
CPC ..... *G05B 23/0208* (2013.01); *G05B 23/0235* (2013.01); *G06V 30/194* (2022.01)

(58) Field of Classification Search
CPC .............. G05B 13/027; G05B 19/4183; G05B 19/4184; G05B 19/41865; G06K 9/66
See application file for complete search history.

(56) References Cited

U.S. PATENT DOCUMENTS

| | | | |
|---|---|---|---|
| 6,181,975 B1 | 1/2001 | Gross et al. | |
| 6,684,121 B1* | 1/2004 | Lu | G05B 23/027 |
| | | | 700/108 |
| 7,152,052 B2* | 12/2006 | Cheng | G05B 11/32 |
| | | | 706/23 |
| 9,110,453 B2* | 8/2015 | Cheng | G05B 13/027 |
| 2015/0177030 A1 | 6/2015 | Vilim et al. | |
| 2019/0188584 A1 | 6/2019 | Rao et al. | |

OTHER PUBLICATIONS

International Search Report and Written Opinion for Application No. PCT/US2020/028965, dated Jul. 21, 2020.

* cited by examiner

*Primary Examiner* — Elias Desta
(74) *Attorney, Agent, or Firm* — Marshall, Gerstein & Borun LLP

(57) ABSTRACT

A real-time control system includes a fault detection training technique to implement a data-driven fault detection function that provides an operator with information that enables a higher level of situational awareness of the current and likely future operating conditions of the process plant. The fault detection training technique enables an operator to recognize when a process plant component is behaving abnormally to potentially take action, in a current time step, to alleviate the underlying cause of the problem, thus reducing the likelihood of or preventing a stall of the process control system or a failure of the process plant component.

25 Claims, 5 Drawing Sheets

SUCCESSIVE MAXIMUM ERROR REDUCTION

TECHNICAL FIELD

The present invention relates generally to process plants such as power generation and industrial manufacturing plants and, more particularly, to a fault detection training system that performs highly accurate, robust fault parameter optimization to detect faults within the operation of the process plant.

DESCRIPTION OF THE RELATED ART

Distributed process control systems, like those typically used in power generation, chemical manufacturing, petroleum processing or other process plants, typically include one or more process controllers communicatively coupled to one or more field devices via analog, digital or combined analog/digital buses. The field devices, which may be, for example, valves, valve positioners, switches, transmitters (e.g., temperature, pressure, level and flow rate sensors), burners, etc. are located within the process environment and perform process functions such as opening or closing valves, measuring process parameters, etc. in response to control signals developed and sent by the process controllers. Smart field devices, such as the field devices conforming to any of the well-known Fieldbus protocols may also perform control calculations, alarming functions, and other functions commonly implemented within or by a process controller. The process controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART and Fieldbus field devices. The control modules within the controller send the process control signals over the communication lines to the field devices to thereby control the operation of the process.

Information from the field devices and the controller is usually made available over a data highway to one or more other computer devices, such as operator workstations, personal computers, data historians, report generators, centralized databases, etc., typically placed in control rooms or other locations away from the harsher plant environment. These computer devices may also run applications that may, for example, enable an operator to perform functions with respect to the process, such as changing settings of the process control routine, modifying the operation of the control modules within the controller or the field devices, viewing the current state of the process, viewing alarms generated by field devices and controllers, keeping and updating a configuration database, etc.

As an example, the Ovation® control system, sold by Emerson Automation Solutions, includes multiple applications stored within and executed by different devices located at diverse places within a process plant. A configuration application, which resides in one or more operator workstations, enables users to create or change process control modules and to download these process control modules via a data highway to dedicated distributed controllers. Typically, these control modules are made up of communicatively interconnected function blocks, which are objects in an object oriented programming protocol and which perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each of the dedicated controllers and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may execute in a still further computer attached to the data highway to store the current process control routine configuration and data associated therewith. Alternatively, the configuration database may be located in the same workstation as the configuration application.

Generally speaking, the control of processes in an industrial plant, such as a power plant, often involves implementing a time ordered set of control actions on various equipment within the plant. This is especially true during plant equipment start-up and shut-down. The initiation of each successive control action is predicated on the completion of the previous control action as well as the condition of some number of permissives to be satisfied. The control of the plant thus proceeds in a step-by-step manner and the control system software that performs this time ordered operation is programmed using a software construct known as sequencing logic. In particular, sequencing logic is a logical set of operations, permissives, and actions, implemented as a computer program, which is executed in a control system. Generally, each sequencing logic includes a series of related steps that are executed in a consecutive manner. Each step generally includes or represents some number of permissives that need to be satisfied and one or more actions to be completed before the conclusion of that step. Permissives are typically a function of one or more external feedback inputs, parameters, and statuses that are evaluated in a logical fashion by the control program. For example, the evaluation or status of each permissive may be the result of a logical operation that evaluates to a true or a false condition. These permissives can be, for example, the state of field equipment (e.g. running/stopped/open/close), the completion of a previous step or action, values of process parameters being above or below a particular threshold, etc. Moreover, the transition from each consecutive step in the logic sequence is predicated on the evaluation of each permissive signal that applies to that step.

As a result, the application designer configures the sequencing logic to require that the permissives be satisfied, meaning that these permissives must evaluate to the expected Boolean state of true or false, prior to going to the next step. Thus, at each step, one or more permissives are evaluated, and when each of these permissives is satisfied, the actions for that step are taken. Once the actions are complete, that step is indicated as complete and the process repeats for the next step in the sequencing logic.

During normal plant operation, the control system is generally operated in an automatic mode and the sequence program or sequencing logic evaluates the feedback signals in determining when to transition to the next step in the sequencing logic without direct human interaction. The associated actions are then performed at each step by the sequence program.

At times, however, the plant may experience an abnormal situation where, for example, one of the expected feedback signals related to the permissives, for example, does not occur in the manner expected. This situation may result in the sequence program halting or stalling. Once the sequence program is stalled, however, human interaction is generally required to resolve the issue and to allow the sequence program to continue. Importantly, a sequence stall can result in the halt of equipment, which can result in manufacturing delays, lost production or revenue, higher operating costs and possibly even equipment damage. In a traditional control system however, the operator may not be aware of an impending abnormal situation, and the resulting sequence stall, until the situation actually occurs and the sequence is halted.

A primary contributor to operator unawareness, and thus the development of sequence-stalling events, is the sheer complexity of the systems involved in process control. Such large and dynamic systems as electrical power plants and oil refineries incorporate thousands of sensors and actuators to determine and to control the physical parameters of the system. Correspondingly, it becomes a monumental task in such systems to verify that the important process parameters are within their appropriate operating ranges. To further complicate matters, the process plant may operate in a multitude of different states to accommodate different production requirements. For example, an electrical power plant may produce different levels of power depending on the amount of power currently required over the associated electrical grid. As a result, the sensors, actuators, and other components of the process control system may have different acceptable ranges of their important operating parameters corresponding to each potential operating state of the plant. Traditional systems designed to monitor and to verify these important parameters check the current values of the parameters against known upper and lower limits for each mode of operation for each state of the plant. However, such monitoring techniques are not complete because the techniques ignore correlations that exist between and among the various parameters of the system.

These correlations can be important, however, because a change to any of the process parameters in a process may impact the values of the other process parameters in the process. To illustrate, assume the process variables of a process include only a temperature and a pressure. The temperature and pressure may be correlated, and as a result, a change in pressure results in a change in temperature. However, the resulting change in temperature is not a random event. The pressure and temperature are correlated in a known, predictable manner. Thus, a desired change in temperature may be achieved, for example, by changing the pressure by a known amount. Unfortunately, power plants and other environments implementing process control systems are generally not a set of small closed systems where each pair of process variables only impact one another. Instead, typical process control system environments include a large number of process variables interacting with one another, meaning a change in one process variable may impact a number of other process variables. As a result, creating a set of one-to-one relationships for process variables, similar to that illustrated in the fictional system above (e.g., pressure-to-temperature), may not adequately describe the correlations between and among the process variables. Nonetheless, even in such large systems, the resulting changes to a plurality of process variables due to a change in any one process variable are still quantifiable and predictable.

For example, a data-driven approach may be used to derive these correlations in large systems. This approach generally involves collecting a large amount of data for each process variable. After collection, the data is then analyzed to determine estimated correlations between each set of process variables. By analyzing data sets that include measurement values for each variable before and after changes to other process variables, the data-driven approach may provide an approximate value for any process variable following a change to any other process variable. Generally, this data-driven approach provides a more accurate estimation as more data is included because the data-driven approach relies on a robust data set to make accurate estimations. In any event, these estimated correlations can be implemented in an on-line environment of the process plant to verify that the important process parameters are within their appropriate operating ranges.

State estimation is a known technique to accurately incorporate such correlations into an on-line environment of a process plant. Simply put, state estimation techniques verify that important process parameters are within appropriate operating ranges by, in part, accounting for the correlations between and among the important process parameters. Multivariate State Estimation Technique (MSET) is a common method of implementing state estimation that involves establishing and monitoring a predefined list of significant process parameters, with each significant process parameter having an associated upper and lower operating limit for each operating state of the process plant. Often, the process control system issues parameter-specific alarms if any of the parameters violates these predefined limits. The strength of this technique derives from the fact that, as explained above, process parameters are coupled, or at least, are correlated with each other. In other words, a change in one process parameter may affect one, some, or every other process parameter. Thus, movement of one significant process parameter without corresponding changes in other process parameters can be a precursor to component failure, process drift, or more immediately, a sequence stall.

More specifically, a MSET determines whether a process is operating "normally" by estimating a set of significant process parameter values of the process based on on-line data, and determining if the on-line data deviates substantially from the estimation. Generally speaking, the process is considered to be operating "normally" if each of the process variables is within a specified threshold range, outside of which, may indicate the process is trending toward a failure condition (e.g., component failure, sequence stall, etc.). To illustrate, a fault detection system incorporated in a process control system may include a MSET in memory to facilitate monitoring the significant process parameters. The fault detection system may first receive a set of on-line data directly from sensors actively monitoring process parameters of the process or from a data historian or other memory source. The on-line data comprises numerical values representing the measured levels of each process variable. For example, a value representing the measured level of pressure in the on-line data may indicate 5 pounds per square inch (psi). Similarly, values representing the temperature, viscosity, flow rate, and/or any other significant process variable may comprise the on-line data.

After receiving the on-line data, the fault detection system uses the on-line data in a series of mathematical operations defining the MSET. The operations yield a set of estimated data, against which, the fault detection system compares the on-line data. Generally, the estimated data reflects the estimated values for each significant process parameter included in the on-line data based on the estimated relationships between and among the significant process parameters, as described above. More specifically, the estimated data represents values for each process variable based on the relationship that each respective process variable bears to every other process variable included in the data set. If the fault detection system determines that the on-line data does not substantially deviate from the estimated data (e.g., respective process parameters do not exceed a threshold variance), the fault detection system determines that the on-line data represents a "normal" operating condition of the process. However, if the fault detection system determines that the on-line data substantially deviates from the estimated data, the fault detection system determines that the on-line data represents an "abnormal" operating condition of the process.

To illustrate, assume a system includes three process variables: temperature, pressure, and flow rate. In this example, assume a received on-line data set indicates that the temperature is 100° F. (Fahrenheit), the pressure is 200 psi, and the flow rate is 1 cubic meter per second. Using the MSET, the resulting set of estimated data may indicate that the estimated temperature is 103° F., the estimated pressure is 198 psi, and the estimated flow rate is 1.1 cubic meter per second. In this case, the temperature is estimated to be higher based on (i) the determined correlation between the temperature and pressure, (ii) the determined correlation between the temperature and flow rate, and (iii) the on-line data values of the temperature, pressure, and flow rate. A similar analysis applies to explain the lower estimated pressure and higher estimated flow rate. If any or all of the estimated values fall outside a predefined range, the fault detection system generates an alert to prompt an operator, technician, etc. to take corrective action.

Generally speaking, the mathematical operations defining the MSET involve the on-line data and a system matrix. As previously mentioned, the on-line data may be received directly from sensors actively monitoring process parameters of the process, or the data may be retrieved from a data historian. The system matrix is a set of vectors where each vector is comprised of a set of variables that collectively represent a "normal" operating condition of the process. Similar to the on-line data, these variables are scalar values (e.g., numbers) corresponding to measurements of the process variables. The overarching purpose of the system matrix is to reliably produce accurate sets of estimated data when combined with the on-line data, in accordance with the mathematical operations of the MSET. If the system matrix is properly constructed, the estimated data accurately represents the expected values of each process variable in any on-line data set under normal operating conditions. Thus, when the system matrix is properly constructed, the fault detection system using an MSET is better able to accurately predict abnormal operating conditions of the process. In any event, because each vector within the system matrix represents a "normal" operating condition of the process, the process variable values comprising each vector may be relied upon to accurately represent the correlations that exist between and among each of the process variables. Thus, the system matrix better encapsulates the correlations between and among the significant process parameters of the process as more vectors representing "normal" operating conditions of the process are included into the system matrix. In this manner, the accuracy of the estimated data sets produced using the system matrix in an MSET is related to the number of vectors comprising the system matrix (e.g., the "size" of the system matrix).

Correspondingly, choosing or generating a system matrix is a critical step in ensuring the success of any fault detection system implementing a MSET. The fault detection system may include a training routine to generate the system matrix as a first step prior to implementing the MSET. Existing training techniques to generate the system matrix prompt an engineer for initial parameter inputs to define the training process. However, these initial parameter inputs tend to be unintuitive and arbitrary, resulting in operator confusion, poorly constructed system matrices, and a generally inaccurate MSET that may permit abnormal process operation by failing to identify significant process parameter deviations.

While many fault detection systems have been proposed and used in process plants, only the most complex fault detection systems are typically able to perform high fidelity verification of the process operation because of the ever-changing conditions within a process plant, including the degradation of devices over time, the presence of unaccounted for disturbance variables within the plant, etc. Moreover, in many known process control systems, it can be difficult to train a fault detection system to monitor a process plant or a portion of the process plant as training activities are performed separately from the display and control activities are performed in the on-line environment of the process plant. As mentioned, training the fault detection system is further complicated because existing training methods incorporate arbitrary and unintuitive initial parameter inputs that may be unrelated to the operation of the process. As a result, most traditional fault detection systems that use an MSET are still not closely coordinated with the actual operation of the process within the process plant.

SUMMARY

An improved training technique for a fault detection system using an MSET generates a system matrix using operator (or engineer)-specified, root-mean-squared (RMS) error threshold values corresponding to each process variable of a process within a process plant and a maximum system matrix size. The improved training technique iteratively expands the system matrix by including on-line process data representing "normal" process operating conditions into the system matrix until the RMS error value for each process variable satisfies the corresponding RMS error threshold value or the maximum system matrix size is reached. In this manner, the improved training technique may sufficiently define the boundaries of "normal" process operating conditions within the system matrix by including enough on-line process data to satisfy the RMS error threshold values for each process variable.

This improved training technique allows an operator to recognize potentially abnormal situations within the process operation before the abnormal situations actually occur. The operator may then potentially take action to alleviate the underlying cause of the problem, thus reducing the likelihood of or preventing a sequence stall of the control program or damage to equipment.

More particularly, the improved training technique uses the RMS error threshold values, the maximum system matrix size, and a set of training data indicative of normal operating conditions of the process to generate the system matrix. The set of training data indicative of the normal operating conditions of the process includes a plurality of vectors, each of which includes one or more data values. In practice, the data values correspond to measured values of process variables, and each vector represents the measured values of all process variables being monitored in the process at a given time.

The fault detection system using the MSET may analyze RMS error values for each process variable during on-line operation of the process to detect potentially abnormal operating conditions. Each process variable may have a unique RMS error threshold value based on the process operation. For example, a process may have a dominant variable, that is typically defined as the process variable with the largest percentage variation over the full range of normal process operating conditions. Typically, the dominant variable should have the largest RMS error threshold of all process variables because the dominant variable experiences the largest fluctuations of all process variables.

The improved training technique allows the operator to specify an RMS error threshold value for each process variable. The operator may, for example, specify that the dominant variable has the largest RMS error threshold of all process variables. The improved training technique generates a system matrix based on the RMS error thresholds that reflect the expected or acceptable RMS error threshold values of each process variable during on-line operation of the process, which in turn increases the accuracy of the MSET and reduces operator confusion related to alerts generated by the fault detection system.

DESCRIPTION OF THE PREFERRED EMBODIMENTS

Figure 1:
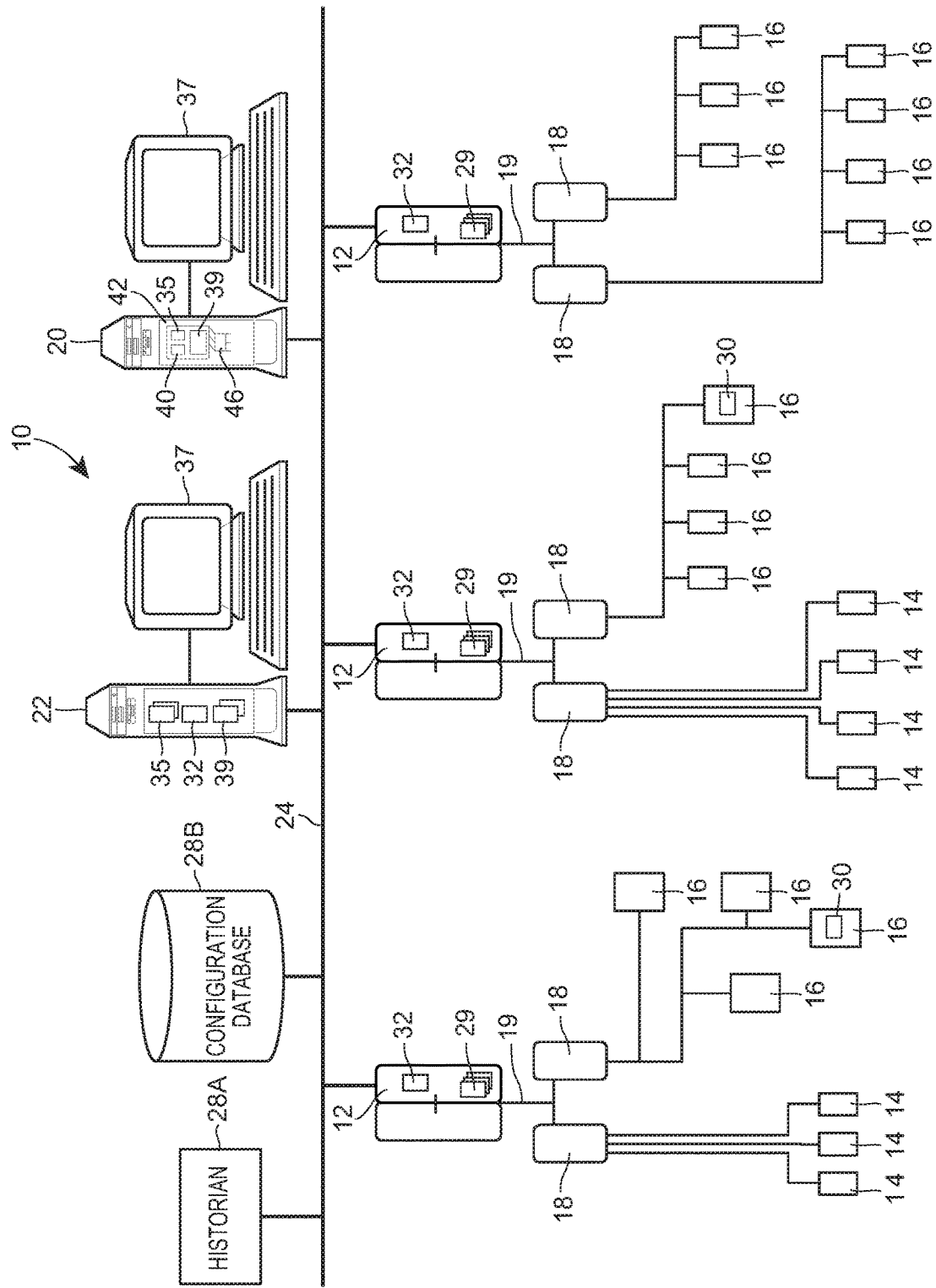
FIG. 1 is a block diagram of a distributed process control network located within a process plant including an operator workstation that implements an improved system matrix training technique for a fault detection system using an MSET, to thereby detect the existence of faults in the operation of the process plant.

FIG. 1 illustrates a process plant 10 having an example control network, such as that associated with a power generation plant, in which the improved training technique may be implemented. In particular, process plant 10 of FIG. 1 includes a distributed process control system, having one or more controllers 12, each of which is connected to one or more field devices 14 and 16 via a bus 19 and input/output (I/O) devices or cards 18 which may be, for example, Fieldbus interfaces, Profibus interfaces, HART interfaces, standard 4-20 ma interfaces, etc. The bus 19 can be any type of communication media such as a serial bus, a wireless bus or connection, or the I/O cards 18 can be located physically at the process controllers 12 or can be located remotely. The controllers 12 are also coupled to one or more host or operator workstations 20 and 22 via a data highway 24 which may be, for example, an Ethernet link. Databases 28A and 28B may be connected to the data highway 24 and operate as data historians which, in the case of the data historian 28A, collect and store historical parameter, status and other data associated with the controllers 12 and field devices 14, 16 within the plant 10 and, in the case of the configuration database 28B, may store configuration and other control data for the plant 10. For example, the database 28B may operate as a configuration database that stores the current configuration of the process control system within the plant 10 as downloaded to and stored within the controllers 12 and field devices 14 and 16. While the controllers 12, the I/O cards 18 and the field devices 14 and 16 are typically located down within and are distributed throughout the sometimes harsh plant environment, the operator workstations 20 and 22 and the databases 28A and 28B are usually located in a control room or other less harsh environments easily accessible by engineers, operators, or maintenance personnel.

As is known, each of the controllers 12, which may be by way of example, the Ovation® controller sold by Emerson Process Management Power and Water Solutions, Inc., stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the Ovation® system protocol use control modules and function blocks typically designed and implemented in an object oriented programming protocol, the control modules could be designed using any desired control programming scheme including, for example, sequential function chart, ladder logic, etc. and are not limited to being designed and implemented using the function block or any other particular programming technique.

In the plant 10 illustrated in FIG. 1, the field devices 14 and 16 are connected to the controllers 12 and may be standard 4-20 ma devices, may be smart field devices, such as HART, Profibus, or FOUNDATION® Fieldbus field devices, which include a processor and a memory, or may be any other desired types of field devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement one or more process control loops, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

Moreover, sequencing logic 32 may be stored in the controllers 12 or in one or more of the workstations 20, 22 or other computer devices, to oversee or control the various control programs to perform sequencing control activities. As noted above, the sequencing logic modules 32 implement a time ordered set of control actions on various equipment within the plant 10. The initiation of each successive control action is predicated on the completion of the previous control action as well as the condition of some number of permissives to be satisfied, which the sequencing logic 32 monitors. The control of the plant 10 thus proceeds in a step-by-step manner based on the operation of the sequencing logic 32. Generally, each sequencing logic 32 includes a series of related steps that are executed in a consecutive manner. Each step generally includes or represents some number of permissives that need to be satisfied and one or more actions to be completed before the conclusion of that step. Permissives are typically a function of one or more external feedback inputs, parameters, and statuses that are evaluated in a logical fashion by the control program. For example, the evaluation or status of each permissive is the result of a logical operation that evaluates to a true or false condition. These permissives can be, for example, the state of field equipment (e.g. running/stopped/open/close), the completion of a previous step or action, values of process parameters being above or below a particular threshold, etc. Moreover, the transition from each consecutive step in the logic sequence is predicated on the evaluation of each permissive signal that applies to that step.

Still further, in a known manner, one or more of the workstations 20 and 22 may include user interface applications to enable a user, such as an operator, a configuration engineer, a maintenance person, etc. to interface with the process control network within the plant 10. In particular, the workstation 22 is illustrated as including one or more user interface applications 35 which may be executed on a processor within the workstation 22 to communicate with the database 28, the control modules 29 or other routines within the controllers 12 or I/O devices 18, with the field devices 14 and 16 and the modules 30, 32 within these field devices, controllers, etc. to obtain information from the plant 10, such as information related to the ongoing state of the process control system. The user interface applications 35 may process and/or display this collected information on a display device 37 associated with one or more of the workstations 20 and 22. The collected, processed and/or displayed information may be, for example, process state information, alarms and alerts generated within the plant 10, maintenance data, etc. Likewise, one or more applications 39 may be stored in and executed in the workstations 22 and 20 to perform configuration activities such as creating or configuring the modules 29, 30, and 32 to be executed within the plant 10, to perform control operator activities, such as changing set-points or other control variables, within the plant 10, etc. Of course the number and type of routines 35 and 39 is not limited by the description provided herein and other numbers and types of process control related routines may be stored in and implemented within the workstations 20 and 22 if desired.

The workstation 20 of FIG. 1 is also illustrated as including a fault detection application 40, which may include a user interface application and data structures for performing fault detection with respect to the operation of the plant 10. In particular, the fault detection application 40 monitors the process plant control network being implemented by the control blocks 29, 30 and 32 as well as other control routines executed within the controllers 12 and possibly the field devices 14, 16. The fault detection application 40 can be accessed by any authorized user (such as a configuration engineer, an operator or some other type of user) to perform training of the fault detection application 40, and the fault detection application 40 enables a user to perform different training and fault detection activities with respect to the process plant 10 while the control system of the process plant 10 remains operational and on-line to control the plant 10.

As illustrated in FIG. 1, the fault detection application 40 may be stored in a memory 42 of the workstation 20 and each of the components of the fault detection application 40 is adapted to be executed on a processor 46 associated with the workstation 20. While the entire fault detection application 40 is illustrated as being stored in the workstation 20, some components of the fault detection application 40 could be stored in and executed in other workstations or computer devices within or associated with the plant 10. Furthermore, the fault detection application 40 can provide display outputs to the display screen 37 associated with the workstation 20 or any other desired display screen or display device, including hand-held devices, laptops, other workstations, printers, etc. Likewise, the fault detection application 40 may be broken up and executed on two or more computers or machines that may be configured to operate in conjunction with one another. For example, the application 40 can be executed within controllers 12, or field devices 14 and 16.

Generally speaking, the fault detection application 40 provides for or enables fault detection regarding the operation of the process plant 10, and more specifically, fault detection regarding the process plant control system implemented by the control routines 29, 30 and 32 within the controllers 12 and field devices 14 and 16. In particular, the fault detection application 40 may determine potentially abnormal operating conditions of the process plant 10 by applying a MSET to on-line process variable data received from the controllers 12 and field devices 14 and 16 to calculate a set of estimated values for each process variable represented in the on-line process variable data. The fault detection application 40 calculates an RMS error value for each process variable using the set of estimated values and the on-line process variable data, and the application 40 compares the RMS error value for each process variable to a corresponding RMS error threshold for each process variable. If the fault detection application 40 determines that the RMS error value for a respective process variable exceeds the corresponding RMS error threshold for the respective process variable, the application 40 determines that a potentially abnormal operating condition exists within the operation of the plant 10. Accordingly, the fault detection application 40 generates and transmits an alert signal to the display screen 37 or any other display screen or display device.

For example, the sequencing logic 32 may instruct the controllers 12 to measure all or some process variables of the plant 10, and transmit the measurements to the fault detection application 40. The fault detection application 40 output may apply to a permissive of the sequencing logic 32. For example, if the application 40 determines that a potentially abnormal operating condition exists within the operation of the plant 10, the permissive may not be satisfied, the operation of the process within the plant 10 may not proceed to the subsequent step of the sequencing logic 32, and the fault detection application 40 may then generate and transmit the alert signal to the display screen 37 to prevent a potential sequence stall before a stall signal flags up.

However, before the fault detection application 40 may apply the MSET to the on-line process variable data, the application 40 must generate a system matrix by applying a training technique to training data received from the controllers 12 and field devices 14 and 16, or a historian database (e.g., historian 28A). While the plant 10 that is being controlled will be described herein as a power generation plant being controlled using distributed control techniques, the fault detection training technique described herein can be used in other types of plants and control systems, including industrial manufacturing plants, water and waste water treatment plants, as well as control systems implemented centrally or within a single computer, and therefore not distributed throughout the plant.

Figure 2:
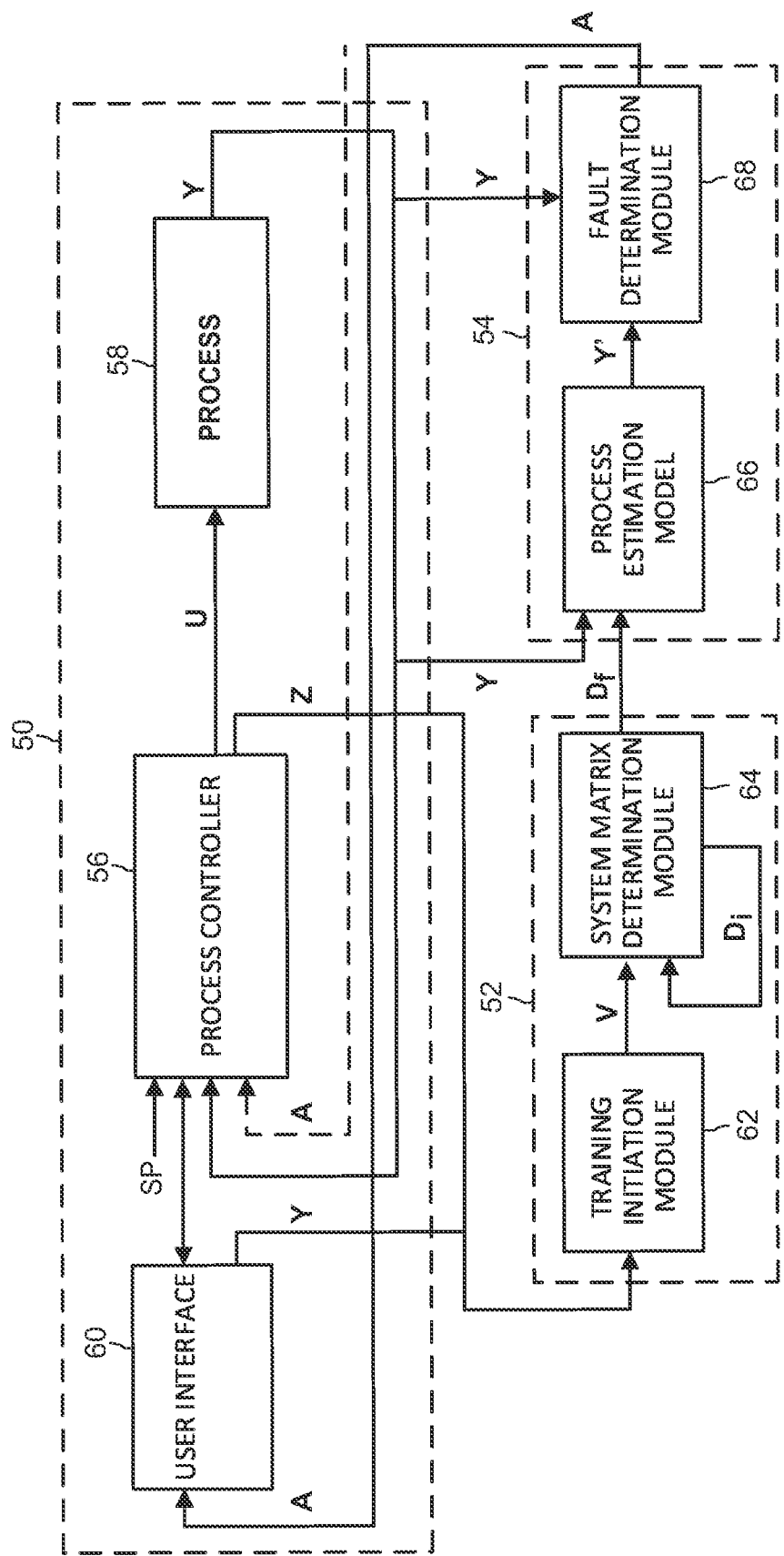
FIG. 2 is a block diagram of a fault detection system using an MSET and a training system that implements an improved system matrix training technique, to thereby detect the existence of faults in the operation of the process plant.

FIG. 2 generally illustrates an example process control system 50, training system 52, and fault detection system 54 to perform fault detection within, for example, the plant 10 of FIG. 1. The process control system 50 may include the control modules 29, 30 and 32 of FIG. 1 as well and any other control routines disposed in and executed within the various control devices (e.g., controllers 12) and field devices (e.g., devices 14 and 16) of the plant 10 of FIG. 1. The training system 52 and the fault detection system 54 may each be incorporated in the operator workstation 20 or 22, and more specifically, in the memory 42. The training system 52 and the fault detection system 54 may each additionally be incorporated as part of the fault detection application 40.

Generally speaking, the process control system 50 monitors physical parameters (e.g., temperature, pressure, etc.) of a process operating within a plant to determine when the physical parameters may need to change. More specifically, the process control system 50, may measure outputs from field devices that control the physical parameters of the process to generate control signals that adjust the operation of the field devices to change the physical parameters as necessary. The process control system 50 may generate these control signals in response to, for example, receiving a new set point of the process or detecting the existence of a fault condition within the operation of the process.

The fault detection system 54 may detect the existence of fault conditions within the operation of a process by utilizing an MSET, which requires a system matrix to perform the calculations defining the MSET. Generally, in order to generate the system matrix, the process control system 50 may record and/or receive (e.g., from a data historian) a set of data comprising on-line data of the process, error thresholds corresponding to each process variable, and a maximum system matrix size. The process control system 50 may transmit the set of data to the training system 52, which generates the system matrix by applying a system matrix training sequence to the set of data. The training system 52 may then transmit the system matrix to the fault detection system 54 in order to compare subsequent on-line data to estimated data generated using the system matrix in the MSET. If the fault detection system 54 determines that the difference between the subsequent on-line data and the estimated data exceeds an error threshold, the fault detection system 54 may determine the existence of a fault in the process operation and generate an alert signal to inform an operator.

The process control system 50 may record on-line data of a process and receive error thresholds corresponding to each process variable and a maximum system matrix size. The process control system 50 may notify an operator of changes taking place to the one or more field devices, and may receive input from an operator regarding adjustments to the one or more field devices, such as a new setpoint of the plant or a control signal for a particular field device.

In particular, the process control system 50 includes a process controller 56 communicatively and physically coupled to a process 58 as well as to a user interface 60. The process controller 56 may include the controllers 12 of FIG. 1 which produce one or more control signals to be delivered to the various control devices within the plant 10 and the control signals implemented by or generated by the sequencing logic 32 to control the control modules within the process, and which together operate to control the plant 10. Of course, the process controller 56 can include any desired types of controllers which implement any desired types of control routines or techniques, such as PID, fuzzy logic, neural network, model predictive control routines, etc.

Likewise, the process 58 includes the units, machines, devices and associated hardware set up to implement the process being controlled. For example, in a power generation plant, the process 58 may include generators, fuel delivery systems, heat exchanges, condensers, steam generators, valves, tanks, etc. as well as sensors and transmitters disposed within the plant to measure various process parameters or variables.

The user interface 60 may allow an operator to view and/or interact with data associated with the process controller 56 and the process 58. Namely, the user interface 60 may be a workstation (e.g., workstation 20) and may have a display screen enabling the operator to view control signals generated by the process controller 56, on-line data from the process 58, and/or other suitable data. The operator may also input commands through the user interface 60, such as control signals to control the operation of the process 58, error thresholds corresponding to each process variable, and a maximum system matrix size.

More specifically, the process controller 56 may receive on-line data Y from the process 58 and generate one or more control signals U that adjust the operation of one or more field devices (e.g., field devices 14, 16) based on the on-line data Y. These control signals are illustrated by the vector U in FIG. 2 to indicate that the process controller 56 may provide a vector of control signals to the process 58 to control the operation of the plant 10. Likewise, as illustrated in FIG. 2, a vector Y of process variables are measured within the process 58 (such as by sensors, etc.) and are delivered as feedback signals to the process controller 56 for use in producing the control signals U. The process controller 56 may also receive additional inputs such as setpoint values SP and state variables for use in producing the control signals U, and these inputs may be delivered by an operator at the user interface 60.

For example, the process controller 56 may receive a setpoint from an operator indicating that the plant 10 is changing from a first operating state to a second operating state that requires a higher temperature within certain portions of the plant 10. The process controller 56 may also receive a set of on-line data Y indicating current physical parameters, such as a current state variable, at least at the certain portions of the plant requiring the higher temperature. The process controller 56 may then analyze the set of on-line data Y to generate one or more control signals U that adjust the operation of one or more field devices (e.g., open/close valves, activate/deactivate fans, etc.) to yield the higher temperature within the certain portions of the plant 10. After the field devices adjust, the process 58 (e.g., via the field devices) may transmit a subsequent set of on-line data Y, including a subsequent state variable, to the process controller 56 to confirm the higher temperature in the certain portions of the plant 10.

In any event, once the process controller 56 receives a set of on-line data Y, the process controller 56 may store the set of on-line data Y in memory (e.g., memory 42). For example, an operator may utilize the user interface 60 to input an instruction causing the process controller 56 to store the set of on-line data Y. The operator may also input an instruction to begin a system matrix training sequence to generate a system matrix. The process control system 50 may then transmit all or a portion of the stored on-line data to the training system 52 to be used as a training data set (e.g., training data set Z).

Generally, a training data set Z represents an aggregation of on-line data Y (including data recorded in a historian database for off-line purposes) as measured within the process 58, and representing normal operating conditions of the process 58. In practice, the on-line data Y, as measured within the process 58, represents a continuous or at least frequently updated stream of data representing the current operating state of the process 58. The process controller 56 aggregates the on-line data Y by executing routines to determine and select normal process variable measurements or simply by receiving a command to aggregate the on-line data Y. Moreover, the training data set Z may include dynamic information to account for changes to the operating state of the process 58 since the acquisition of the training data set Z. This dynamic information may include: a first, second, or any higher order derivative of a process variable; a mean, a median, a mode, a standard deviation, a maximum, a minimum, or any other statistical representation of historical values of a process variable; frequency components of a process variable signal; time stamp information of a process variable signal; and/or any other suitable information. Moreover, this dynamic information may be included into a vector of the training data set Z, or may comprise a distinct vector to be included in the training data set Z.

A system matrix training sequence generally requires a training data set, a set of error thresholds, and a maximum system matrix size. Each error threshold generally corresponds to a deviation of a process variable from an estimated value that the training system 52 generates by applying the MSET to the training data set Z. Typically, each error threshold is calculated based on a percentage of an acceptable value range of a corresponding process variable during on-line operation of a process, and is calculated prior to the system matrix training sequence. The set of error thresholds may be calculated by, for example, the training system 52. The maximum system matrix size may generally correspond to a maximum number of vectors to be included in the system matrix, and may be based on the storage capacity and/or processing power of the operator workstations 20, 22, controllers 14, and/or field devices 14 or 16. In practice, the maximum system matrix size is not application dependent, and as a result, an engineer may select a value for the maximum system matrix size based on the processing speed and memory capacity of the computer executing the training process. The maximum system matrix size may be fixed as a non-tunable parameter by an operator to standardize the training process by generating a consistently sized system matrix and expedite future training sequences by eliminating additional user input. Accordingly, an engineer may input an error parameter used to calculate the set of error thresholds and a maximum system matrix size (collectively referenced as a "training initiation input X").

In embodiments, when an operator or engineer inputs an instruction to begin a system matrix training sequence, the engineer/operator may also designate a process variable as a dominant variable. The dominant variable is typically defined as the process variable with the largest percentage variation over the full range of normal process 58 operating conditions. Alternatively, the training system 52 may automatically determine the dominant variable by analyzing the percentage variation of each process variable over the normal operating range to determine the process variable corresponding to the largest percentage variation over the normal operating range. In practice, the dominant variable may be the process variable that most impacts the other process variables of the process 58, or the dominant variable may simply be the variable of most interest to the engineer/operator. Accordingly, the engineer/operator may designate a dominant variable in situations where the training system 52 may not automatically designate the variable of interest after the numerical analysis described above. In any event, when the engineer/operator designates the dominant variable, the user interface 60 transmits the dominant variable designation as part of the training initiation input X.

Generally, the training system 52 uses inputs from the process control system 50 to generate a system matrix for use in fault detection during on-line operation of the process 58. The training system 52 generates the system matrix by applying a system matrix training sequence to the inputs received from the process control system 50. More specifically, the training system 52 determines whether the inputs received from the process control system 50 include the necessary data to perform the system matrix training sequence, and if so, performs the system matrix training sequence by iteratively applying the MSET to the training data set Z and the training initiation input X to generate the system matrix.

As illustrated in FIG. 2, the training system 52 includes a training initiation module 62 and a system matrix determination module 64. The training initiation module 62 generally uses the inputs from the process control system 50 to determine whether the necessary data is present to perform the system matrix training sequence. More specifically, the training initiation module 62 analyzes the training data set Z and the training initiation input X to determine whether they collectively include a training data set, an error parameter, and a maximum system matrix size, each of which is required to perform the system matrix training sequence. If the training initiation module 62 determines each of a training data set, an error parameter, and a maximum system matrix size is present, the training initiation module 62 may generate a set of error thresholds and an initiation signal. The training initiation module 62 includes each of the training data set, the set of error thresholds, the maximum system matrix size, and the initiation signal in a training initiation signal V configured to initiate the system matrix training sequence that the module 62 then transmits to the system matrix determination module 64.

As an example of generating the set of error thresholds, assume a process 58 operating within a plant 10 includes n process variables such that 1≤i≤n, where i denotes a particular process variable. When initiating a system matrix training sequence, the user interface 60 may display a request for an operator to choose a maximum system matrix size and an error parameter (e.g., percentage) corresponding to an error threshold for each process variable (i). An error threshold (denoted here as $T_{rms,i}$), can be defined as follows:

$$T_{rms,i} = \alpha * \frac{(x_{max,i} - x_{min,i})}{100} \quad (1)$$

where $x_{max,i}$ and $x_{min,i}$ are maximum and minimum "normal" values, respectively, for each process variable (i) within the training data set Z, and α is the error parameter the operator may adjust to influence the error threshold as necessary. For example, if the engineer/operator needs to lower $T_{rms,i}$, and correspondingly, increase the accuracy of the system matrix training sequence, the engineer/operator may decrease α. Once the operator adjusts α to a desired level and provides a maximum system matrix size, the user interface 60 transmits α and the maximum system matrix size to the training system 52 via the training initiation input X. The training system 52, and specifically the training initiation module 62, receives the training initiation input X and the training data set Z, and calculates an error threshold for each process variable (i) using equation (1).

However, if the training initiation module 62 determines that one or more of a training data set, an error parameter, and a maximum system matrix size is absent, the training initiation module 62 may not generate the training initiation signal V, and thus not initiate the system matrix training sequence. For example, the training initiation module 62 may determine that the training data set is present, but that the error parameter and the maximum system matrix size are absent because no training initiation input X was received. Typically, the system matrix training sequence is performed off-line so that an engineer/operator may not initiate the training sequence, but in embodiments, the training initiation input X may represent an operator command to initiate or re-initiate the system matrix training sequence. In these embodiments, once an engineer/operator determines that the training system 52 has an adequate training data set Z to perform the system matrix training sequence, the engineer/operator may enter the training initiation input X via the user interface 60, instructing the training initiation module 62 to generate the training initiation signal V. In embodiments, the training initiation module 62 may generate a training initiation signal V based solely on the training data set Z, but the training initiation module 62 typically delays generating the training initiation signal V until an engineer/operator provides the training initiation input X via the user interface 60.

Moreover, in embodiments, the training initiation module 62 may retrieve from memory an error parameter and/or a maximum system matrix size if the training initiation input X does not include one or both of these values. For example, the training initiation module 62 may retrieve an error parameter and/or a maximum system matrix size an operator may pre-determine and store in memory. The training initiation module 62 may also calculate the error parameter and/or a maximum system matrix size based on previous system matrix training sequences or some other suitable generation technique/model. For example, the training initiation module 62 may calculate values for an error parameter and/or a maximum system matrix size based on known processing power/storage capabilities and/or required/desired system matrix training accuracy, respectively. To illustrate, if the storage capacity (e.g., available memory) of the control network cannot accommodate a system matrix larger than 2 MB, the training initiation module 62 may calculate a maximum system matrix size that corresponds to a file size less than or equal to 2 MB.

The training initiation signal V may include the training data set, a set of error thresholds, the maximum system matrix size, and an initiation signal configured to cause the system matrix determination module 64 to perform the system matrix training sequence. Generally, the set of error thresholds may correspond to RMS error thresholds for each process variable, but it will be appreciated that any suitable error metric, such as variance, can be used as to define the set of error thresholds. RMS error is a familiar error index in the process modeling field that is widely accepted by practitioners (e.g., plant operators) and provides a robust, self-defining error threshold because the RMS error is typically the value of interest when evaluating on-line data Y regardless of whether the RMS error is explicitly included in the training process.

In any event, the training initiation module 62 may transmit the training initiation signal V to the system matrix determination module 64 to initiate the system matrix training sequence. Generally, the system matrix determination module 64 uses the data included in the training initiation signal V to generate the system matrix by performing the system matrix training sequence. More specifically, the system matrix determination module 64 performs the system matrix training sequence by iteratively applying the MSET to the training data set Z and evaluating the results with the training initiation input X to generate the system matrix.

At a high level, the system matrix training sequence performed by the system matrix determination module 64 includes iteratively analyzing and including vectors from the training data set Z into a current system matrix $D_i$. Generally, at the beginning of the system matrix training sequence, the current system matrix $D_i$ includes two vectors from the training data set Z. One or more vectors from the training data set Z are generally added to the current system matrix $D_i$ during each iteration of the system matrix training sequence that the system matrix determination module 64 performs. More specifically, the system matrix determination module 64 may analyze vectors from the training data set Z by applying the mathematical operations defining the MSET to the training data set Z to generate an estimated vector for each vector in the training data set Z. The estimated vectors may generally include estimated values for each process variable included in the training data set Z. The system matrix determination module 64 may then compute RMS error values for each process variable represented in the training data set Z by comparing the values of the process variables in the training data set Z with the corresponding values in the estimated vectors. If the RMS error value for any process variable exceeds the corresponding error threshold, a vector corresponding to the maximum error for that process variable from the training data set Z is selected and included in the current system matrix $D_i$ for subsequent iterations of the system matrix training sequence. The system matrix determination module 64 may iteratively update the current system matrix $D_i$ in this manner until the system matrix determination module 64 determines that the current system matrix $D_i$ is a final system matrix $D_f$ because, for example, the error thresholds are no longer exceeded and/or the current system matrix reaches the maximum system matrix size included in the input data from the training initiation module 62. Following the system matrix training sequence, the system matrix determination module 64 may transmit the final system matrix $D_f$ to the fault detection system 54 for use in fault detection during on-line operation of the process 58.

In practice, the fault detection system 54 is configured to detect potential fault conditions (e.g., "abnormal" operating conditions) within the plant 10. To do this, the fault detection system 54 applies the mathematical operations defining the MSET, using the final system matrix $D_f$, and on-line data Y, to identify any process variable in the on-line data Y that exceeds its corresponding error threshold, and generates an alert signal for the process control system 50 indicating an abnormal operating condition. The fault detection system 54 may receive the final system matrix $D_f$ and the set of error thresholds from the training system 52, and may receive the on-line data Y from the process control system 50.

The fault detection system 54 includes a process estimation model 66 and a fault determination module 68. Broadly speaking, the process estimation model 66 applies the mathematical operations defining the MSET, using the final system matrix $D_f$, to on-line data Y. More specifically, the process estimation model 66 may determine an estimated vector matrix Y' that includes an estimated vector corresponding to each vector in the on-line data Y by applying the MSET with the final system matrix $D_f$. The process estimation model 66 then transmits the estimated vector matrix Y' and the set of error thresholds to the fault determination module 68.

Generally, the fault determination module 68 identifies any process variable in the on-line data Y that exceeds its corresponding error threshold, and generates an alert signal for the process control system 50 indicating an abnormal operating condition. More specifically, the fault determination module 68 calculates RMS error values for each process variable included in the on-line data Y by comparing each vector in the on-line data Y to its corresponding vector in the estimated vector matrix Y'. Should any RMS error value exceed the corresponding error threshold, the fault determination module 68 produces an alert signal A indicating a potential fault or other abnormal operating condition associated with the process 58 for transmission to at least the user interface 60. In this manner, the module 68 may alert an operator to abnormal process 58 operating conditions which allows the operator to take corrective actions to prevent equipment damage, equipment failure, sequence stalls, or other potential plant 10 issues.

Figure 3A:
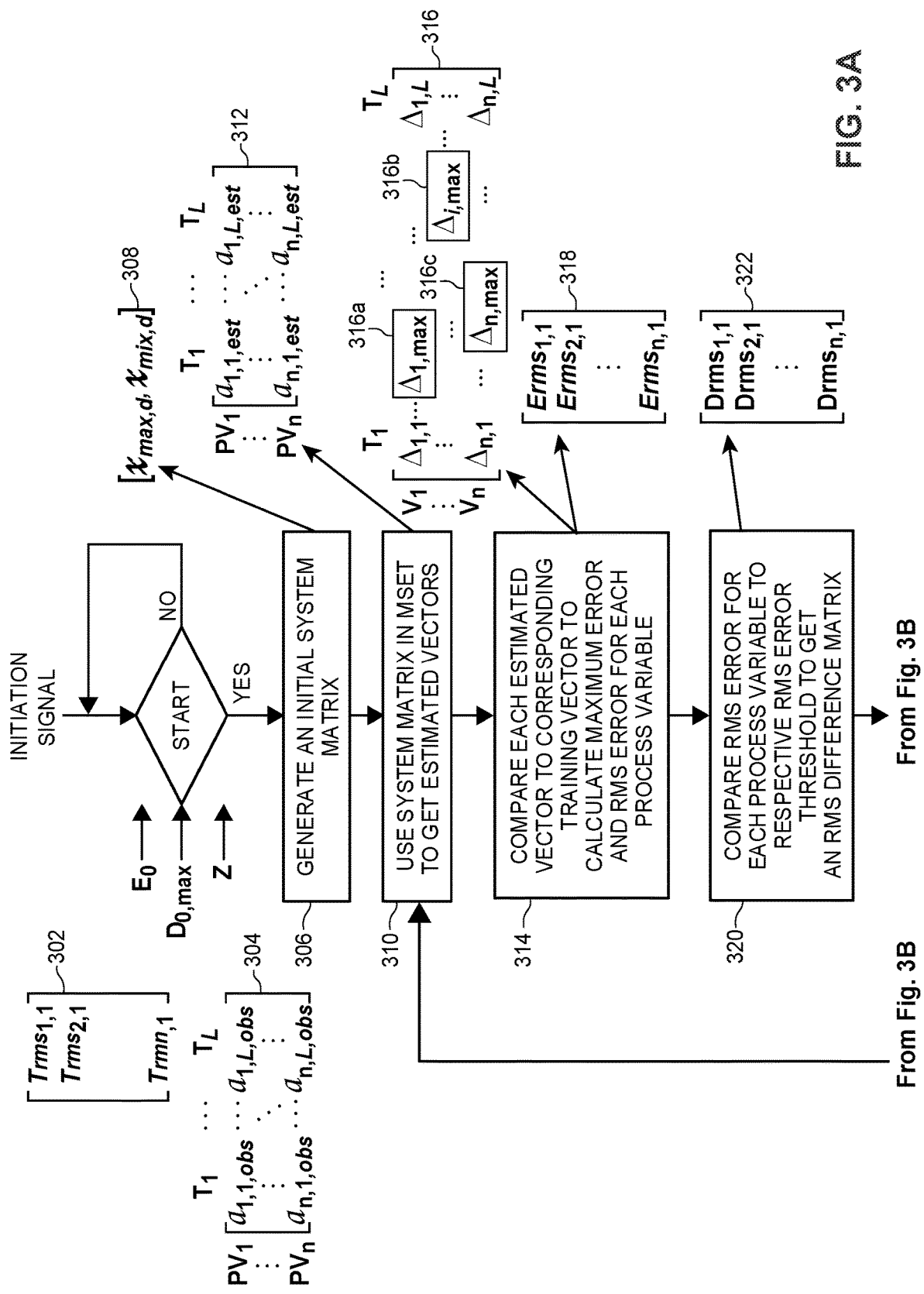
FIG. 3A is a flow diagram of an improved system matrix training technique that generates a system matrix for use in a fault detection system to detect the existence of faults in the operation of a process plant.

FIG. 3A is a flow diagram of a system matrix training sequence 300 that generates a system matrix for use in a fault detection system to detect faults in the operation of a process plant. Generally speaking, the system matrix training sequence 300 may start (YES branch of START block) when the system matrix determination module 64 receives an initiation signal, a training data set Z, a maximum system matrix size $D_{o,max}$, and a set of error thresholds $E_o$. Typically, the system matrix training sequence 300 is performed off-line. As a result, the training initiation module 62 may automatically generate the initiation signal upon receipt of the training data set Z, the maximum system matrix size $D_{o,max}$, and the set of error thresholds $E_o$. More specifically, the system matrix determination module 64 may attempt to start the system matrix training sequence 300 once the system matrix determination module 64 receives the initiation signal. If the system matrix determination module 64 receives the initiation signal but has not yet received or otherwise accessed one or more of the training data set Z, the maximum system matrix size $D_{o,max}$, or the set of error thresholds $E_o$, the system matrix determination module 64 may not start the system matrix training sequence 300 (NO branch of START block).

The training initiation signal is generally an instruction received from the training initiation module 62 commanding the system matrix determination module 64 to start the system matrix training sequence 300. The maximum system matrix size $D_{o,max}$ is generally a scalar value representing the maximum number of vectors from the training data set Z that the system matrix training sequence 300 may include in the system matrix. The system matrix training sequence 300 may be performed by, for example, the system matrix determination module 64.

The set of error thresholds $E_0$ may be represented by an error matrix 302, wherein each entry in the error matrix 302 is an error threshold for a process variable of a process (e.g., process 58). For example, assume a process has n process variables. The error matrix 302 may have n entries, and each entry in the error matrix 302 may be an error threshold for a corresponding process variable. Accordingly, $Trms_{1,1}$ is an error threshold for the first process variable, $Trms_{2,1}$ is an error threshold for the second process variable, $Trms_{3,1}$ is an error threshold for the third process variable, etc. Each error threshold included in the set of error thresholds may be calculated by, for example, the training initiation module 62.

The training data set Z may be represented by a training data matrix 304, wherein each entry in the training data matrix 304 may be an on-line measurement of a process variable of a process (e.g., process 58) at a particular time. Each column of the training data matrix 304 may represent a measurement of each process variable (e.g., $PV_1$, $PV_2$, ..., $PV_n$) of the process at a distinct moment in time (e.g., $T_1$, $T_2$, ..., $T_L$) during the on-line operation of the process. Each row of the training data matrix 304 may represent measurements of an individual process variable of the process at different moments in time during the on-line operation of the process. For example, assume a process has n process variables and each of the process variables is measured L times to create the training data set Z. The training data matrix 304 may have n×L entries, and each entry in the training data matrix 304 may be an on-line measurement of a process variable of the process. Accordingly, $a_{1,1,\ obs}$ is an on-line measurement for a first process variable taken at a first time, $a_{2,1,\ obs}$ is an on-line measurement for a second process variable taken at the first time, $a_{2,2,\ obs}$ is an on-line measurement for the second process variable taken at a second time, etc (e.g., the designation "obs" generally references on-line data of the process).

The system matrix training sequence 300 continues by generating an initial system matrix 308 (block 306). Generally speaking, the initial system matrix 308 includes two vectors from the training data set Z that include a minimum and a maximum value of a dominant process variable, respectively. The dominant process variable may be identified in the training initiation signal X, and/or the system matrix determination module 64 may determine the dominant process variable by analyzing the percentage variation of each process variable over the normal operating range to determine the process variable corresponding to the largest percentage variation over the normal operating range. The system matrix determination module 64 may analyze each entry in the training data set Z corresponding to the dominant process variable to determine both the minimum and the maximum value of the dominant process variable. The system matrix determination module 64 then generates an initial system matrix 308 defined as:

$$D_i = [x_{max,d}, x_{min,d}] \quad (2)$$

where $x_{max,d}$ and $x_{min,d}$ represent two distinct vectors (e.g., two distinct columns of data) from the training data set Z that contain the maximum and minimum values of the dominant variable, respectively.

For example, assume that the dominant process variable in the process represented by the training data matrix 304 is the first process variable (e.g., $PV_1$). The system matrix determination module 64 may analyze each of the L entries related to the first process variable (e.g., $a_{1,1,obs}$, $a_{1,2,obs}$, $a_{1,3,obs}$, ..., $a_{1,L,obs}$) to determine a first process variable entry with a smaller value than every other first process variable entry and a first process variable entry with a greater value than every other first process variable entry. For example, assume that the system matrix determination module 64 determines that first process variable entries $a_{1,1,obs}$ and $a_{1,2,obs}$ correspond to the maximum and minimum values of the first process variable, respectively. The system matrix determination module 64 may include the vectors $x_{i,1,obs}$ and $x_{i,2,obs}$ from the training data set Z that include $a_{1,1,obs}$ and $a_{1,2,obs}$, respectively, into the initial system matrix 308.

Typically, the two vectors comprising the initial system matrix 308 may be insufficient to define the boundaries of "normal" process operating conditions for all process variables in a process. More specifically, the initial system matrix 308 may be insufficient to estimate process variable values that result in an RMS error value for each process variable that satisfies the corresponding RMS error threshold value, which in turn, may generate false positive/negative determinations of the existence of fault conditions within the process (e.g., process 58). To avoid this result, the system matrix training sequence 300 may estimate process variable values using the initial system matrix 308, check whether any of the process variable RMS error values exceed the corresponding RMS error threshold value, and include more vectors from the training data set Z into the initial system matrix 308 (thereafter referenced as the "current system matrix" or "currently configured system matrix") to better represent the "normal" process operating conditions within the system matrix. The system matrix training sequence 300 may also iteratively perform these actions with the currently configured system matrix until the RMS error value for each process variable satisfies the corresponding RMS error threshold value or the maximum system matrix size is reached Accordingly, the system matrix training sequence 300 continues by using the currently configured system matrix in the MSET to generate an estimated data matrix 312 (block 310). The system matrix determination module 64 applies the MSET to the training data set Z in accordance with the formula:

$$X_e = D_i \cdot (D_i^T \otimes D_i)^{-1} \cdot (D_i^T \otimes X_o) \quad (3)$$

to generate the estimated data matrix 312, where $X_o$ is an observed vector in the training data set Z, and $X_e$ is an estimated vector in the estimated data matrix 312. For any training data set Z containing L observed vectors (e.g., $X_{o,1}$, $X_{o,2}$, $X_{o,3}$, ..., $X_{o,L}$), the system matrix determination module 64 determines L corresponding estimated vectors (e.g., $X_{e,1}$, $X_{e,2}$, $X_{e,3}$, ..., $X_{e,L}$). For example, assume that the training data set Z includes three observed vectors (e.g., $X_{o,1}$, $X_{o,2}$, and $X_{o,3}$). By operating the system matrix (e.g., initial system matrix 308) on each of the observed vectors ($X_{o,1}$, $X_{o,2}$, and $X_{o,3}$), the system matrix determination module 64 determines three corresponding estimated vectors (e.g., $X_{e,1}$, $X_{e,2}$, and $X_{e,3}$).

The system matrix training sequence 300 continues by comparing each estimated vector $X_e$ to a corresponding observed vector $X_o$ to calculate an RMS error value for each process variable (block 314). Generally, the system matrix determination module 64 may generate a difference matrix 316 according to the following formula:

$$\Delta_{i,j} = a_{i,j,est} - a_{i,j,obs} \quad (4)$$

for all i=1, ..., n and j=1, ..., L. Namely, the system matrix determination module 64 may subtract each entry in the training data set 304 (e.g., $a_{1,1,obs}$, $a_{1,2,obs}$, $a_{1,3,obs}$, ..., $a_{n,L,obs}$) from a corresponding entry in the estimated data matrix 312 (e.g., $a_{1,1,est}$, $a_{1,2,est}$, $a_{1,3,est}$, ..., $a_{n,L,est}$) (the designation "est" generally references estimated data of the process) to generate each entry in a difference matrix 316 (e.g., $\Delta_{1,1}$, $\Delta_{1,2}$, $\Delta_{1,3}$, ..., $\Delta_{n,L}$). For example, the system matrix determination module 64 may subtract entry $a_{1,1,obs}$ from $a_{1,1,est}$ to generate entry $\Delta_{1,1}$ in the difference matrix 316.

The system matrix determination module 64 may also identify the maximum error values for each process variable by calculating the absolute value of each entry in the difference matrix 316. The system matrix determination module 64 may identify an entry with the largest absolute value for each process variable, and designate the entry with the largest absolute value as the maximum error value for the process variable (e.g., 316a, 316b, 316c). For example, the system matrix determination module 64 may calculate the absolute value of each entry in the difference matrix 316 corresponding to the first process variable ($PV_1$), identify the entry with the largest absolute value, and designate the entry with the largest absolute value as the maximum error value for the first process variable 316a.

The system matrix determination module 64 may also calculate the RMS error value for each process variable to generate the RMS error matrix 318, in accordance with the following formula:

$$Erms_{i,1} = \sqrt{\frac{\sum_{j=1}^{L}(X_{e,j}(i) - X_{o,j}(i))^2}{L}} \quad (5)$$

for all i=1, ..., n. For example, the system matrix determination module 64 may calculate the RMS error for the first process variable ($PV_1$) to generate entry $Erms_{1,1}$ in the RMS error matrix 318.

Generally, the RMS error values indicate the accuracy of the MSET using the system matrix as applied to the training data set Z for a given iteration of the system matrix training sequence 300. As the accuracy of the MSET using the system matrix increases, the RMS error values decrease. As a result, for each iteration of the system matrix training sequence 300, the RMS error values corresponding to each process variable should decrease. Hence, in embodiments, the system matrix determination module 64 may compare the RMS error values for each process variable at an iteration to the RMS error values of the process variables at a prior iteration to ensure the accuracy of the MSET using the system matrix increases.

Figure 3B:
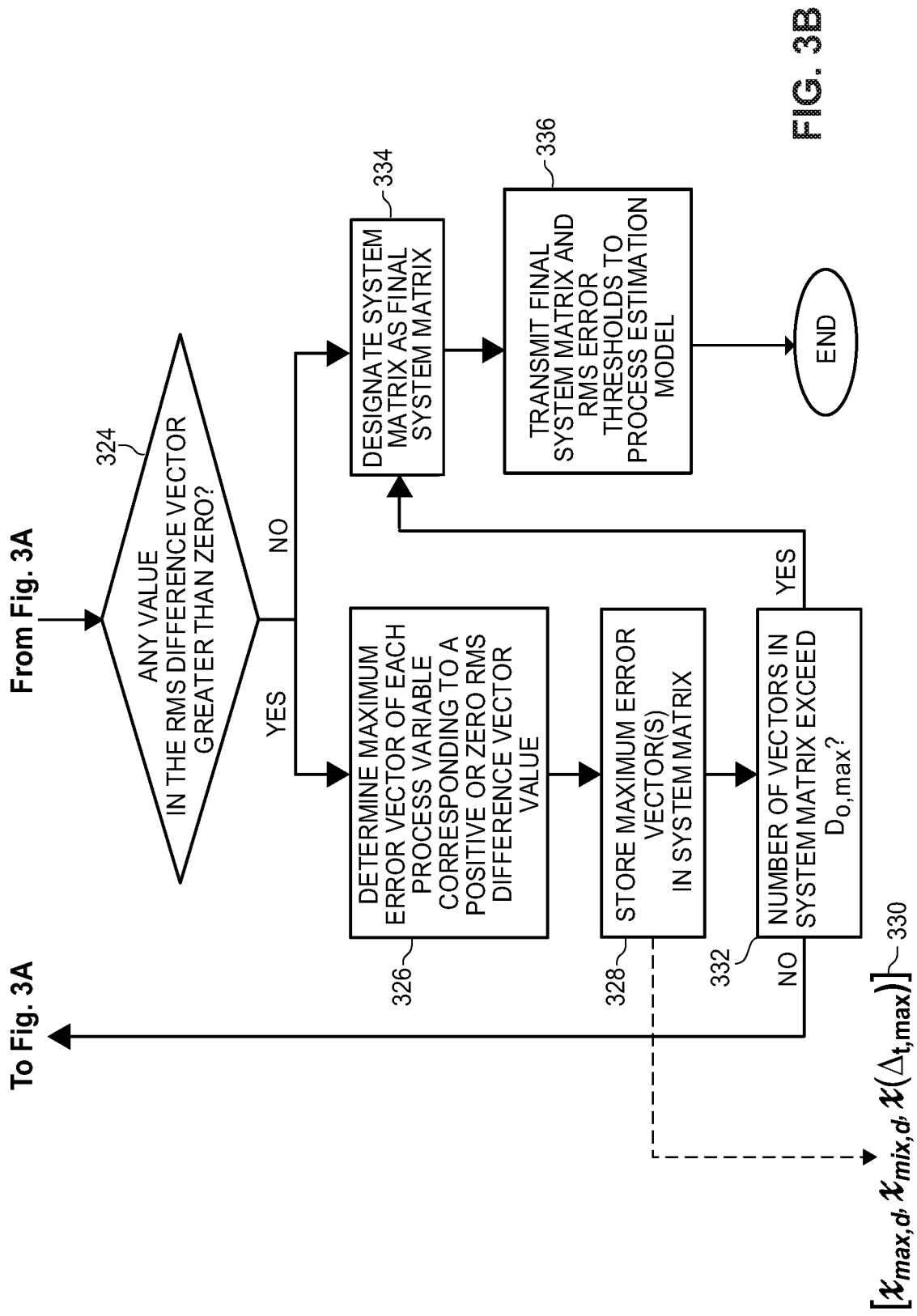
FIG. 3B is a flow diagram of an improved system matrix training technique that generates a system matrix for use in a fault detection system to detect the existence of faults in the operation of a process plant.

The system matrix training sequence 300 continues by comparing the RMS error for each process variable to a corresponding RMS error threshold to determine whether any RMS error values exceed the corresponding RMS error threshold (block 320). Generally, the system matrix determination module 64 subtracts RMS error threshold values included in the error matrix 302 from the RMS error values included in the RMS error matrix 318 to calculate RMS difference values to be included in a RMS difference matrix 322. More specifically, the system matrix determination module 64 calculates RMS difference values in accordance with the formula:

$$Drms_{i,1} = Erms_{i,1} - Trms_{i,1} \quad (6)$$

for all i=1, ..., n. For example, the system matrix determination module 64 may calculate the RMS difference value for the first process variable (IVO to generate entry $Drms_{1,1}$ in the RMS difference matrix 322. As depicted in FIG. 3B, the system matrix determination module 64 then determines (at block 324) whether the RMS error value exceeds the RMS threshold value in accordance with the following relation:

$$0 < Drms_{i,1} \quad (7)$$

for all i=1, ..., n. The system matrix determination module 64 may either determine that the RMS difference value for any process variable is greater than zero (YES branch of block 324) or that the RMS difference value for a process variable is less than or equal to zero (NO branch of block 324).

If the system matrix determination module 64 determines that at least one RMS difference value is greater than zero (YES branch of block 324), then the system matrix determination module 64 may determine at least one vector from the training data set Z to include in the system matrix (block 326). More specifically, the system matrix determination module 64 may determine a maximum error vector of each process variable that has a RMS difference value that is greater than zero. For example, assume that the RMS difference value corresponding to the first process variable (e.g., $Drms_{1,1}$) is greater than zero and that the largest entry in the difference matrix 316 for the first process variable is included in the third vector entry (e.g., $\Delta_{1,3} = \Delta_{1,max}$). The system matrix determination module 64 may then designate the third vector entry in the training data set Z (e.g., $T_3 = [a_{1,3,obs}, a_{2,3,obs}, a_{3,3,obs}, \ldots, a_{n,3,obs}]$) as the maximum error vector for the first process variable.

The system matrix determination module 64 may then include the maximum error vector into the system matrix to perform another iteration of the system matrix training sequence 300 (block 328). Generally, the system matrix determination module 64 may generate a current system matrix 330 that includes the vectors comprising the initial system matrix 308 and all vectors from the training data set Z that include a maximum error for a respective process variable that has a RMS difference value greater than zero (e.g., $x(\Delta_{i,max})$). For example, assume that during a first iteration of the system matrix training sequence 300, a first process variable (PV1) and a third process variable (PV3) have a RMS difference value that is greater than zero and the values from the training data set Z corresponding to the maximum errors for each process variable are $a_{1,3,obs}$ and $a_{3,5,obs}$, respectively. The system matrix determination module 64 may designate the vectors including the maximum values ($T_3 = [a_{1,3,obs}, a_{2,3,obs}, a_{3,3,obs}, \ldots, a_{n,3,obs}]$ and $T_5 = [a_{1,5,obs}, a_{2,5,obs}, a_{3,5,obs}, \ldots, a_{n,5,obs}]$) as the maximum error vectors for the first and third process variable, and may include these vectors in the initial system matrix 308. As a result, the system matrix determination module 64 generates the current system matrix 330, which includes [$x_{max,d}, x_{min,d}, T_3, T_5$].

Prior to initiating a subsequent iteration of the system matrix training sequence 300, the system matrix determination module 64 may check the size of the current system matrix 330 to ensure it does not exceed the maximum system matrix size $D_{o,max}$ (block 332). Generally, the system matrix determination module 64 may simply count the number of vectors included in the current system matrix 330 and determine whether that number exceeds the maximum system matrix size $D_{o,max}$. If the number of vectors in the current system matrix 330 is greater than or equal to the maximum system matrix size $D_{o,max}$ (YES branch of block 332), then the system matrix determination module 64 may terminate the system matrix training sequence 300 by designating the current system matrix 330 as a final system matrix $D_f$ (block 334) and transmitting the final system matrix $D_f$ and the set of error thresholds $E_o$ to the process estimation model 66 (block 336). Additionally or alternatively, the system matrix determination module 64 may send an alert signal to an engineer/operator that the system matrix training sequence 300 has failed to satisfy the RMS error thresholds for all process variables of the training data set Z. If the number of vectors in the current system matrix 330 is less than the maximum system matrix size $D_{o,max}$ (NO branch of block 332), then the system matrix determination module 64 may initiate a subsequent iteration of the system matrix training sequence 300 by applying the MSET to the training data set Z (block 310) in accordance with equation (3), using the current system matrix 330.

Incorporating the maximum error vectors into the current system matrix 330 (and by extension, the final system matrix $D_f$) increases the overall accuracy of the fault detection system 54. Each maximum error vector is included in the training data set Z and each maximum error vector represents normal operating conditions of the process 58. Additionally, each maximum error vector includes at least one process variable that exceeds the error thresholds defining a "normal" operating condition of the process 58, and as a result, the fault detection system 54 may incorrectly identify a maximum error vector as an "abnormal" operating condition (e.g., a "false positive") prior to the system matrix training sequence 300. However, the system matrix training sequence 300 includes each maximum error vector into the system matrix, which increases the accuracy of estimated values produced by applying the MSET to the on-line data Y. The fault detection system 54 may then produce fewer false positives because the error values (e.g., difference matrix 316) produced by comparing the on-line data Y to the estimated values may more accurately indicate the deviation of the on-line data Y from "normal" operating conditions.

Moreover, in embodiments, the system matrix determination module 64 may analyze prior system matrix training sequence 300 iteration RMS error values to extrapolate the RMS error values of subsequent system matrix training sequence 300 iterations. In these embodiments, the system matrix determination module 64 may determine that the RMS error values for one or more process variables are extrapolated to decrease, but that the magnitude of such decreases is insufficient to satisfy the RMS error thresholds (e.g., equation (7) is satisfied for at least one process variable) before reaching the maximum system matrix size $D_{o,max}$. This determination may signal that the system matrix training sequence 300 has malfunctioned, and as a result, the system matrix determination module 64 may not determine a final system matrix $D_f$. In this circumstance, the system matrix determination module 64 may need to perform the system matrix training sequence 300 again, likely with different input training parameters (e.g., a different set of error thresholds $E_o$, a different maximum system matrix size $D_{o,max}$, etc.). Correspondingly, the system matrix determination module 64 may generate an alert signal (e.g., alert signal A) to alert an operator of the malfunctioned system matrix training sequence 300 via the user interface 60.

If the system matrix determination module 64 determines that all RMS difference values are less than or equal to zero (NO branch of block 324), then the system matrix determination module 64 may designate the current system matrix (e.g., current system matrix 330) as a final system matrix $D_f$ to terminate the system matrix training sequence 300 (block 334). Subsequently, the system matrix determination module 64 may transmit the final system matrix $D_f$ and the set of error thresholds $E_o$ to the fault detection system 54 (block 336), and more specifically, to the process estimation model 66 to perform fault detection during on-line operation of the process 58 with the final system matrix $D_f$ and the set of error thresholds $E_o$.

Figure 4A:
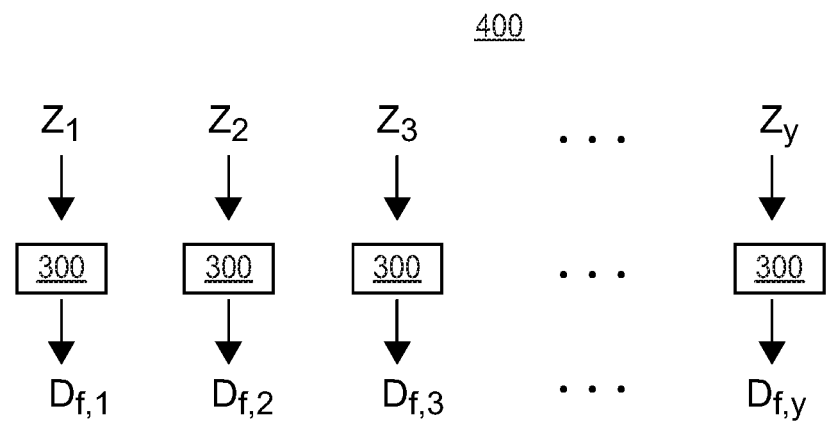
FIG. 4A is a flow diagram of an improved training technique generating a set of system matrices for use in a fault detection system to detect the existence of faults in the operation of a process plant.

FIG. 4A is a flow diagram of multiple system matrix training sequence iterations 400 generating a set of system matrices for use in a fault detection system to detect faults in the operation of a process plant. As a general principle, when a large amount of data is present in a control system, the data typically arrives in the form of many smaller data sets. The smaller data sets can be in the form of multiple files, multiple tables in a database (e.g., historian 28A, configuration database 28B), or multiple data packets in the communication network or computer internal memory (e.g., memory 42). Even when data arrives at the network in a singular package, users (e.g., operators) tend to divide the data into smaller portions for easier handling and processing. For example, a fault detection system (e.g., fault detection system 54) may store multiple system matrices as a result of multiple iterations of the system matrix training sequence 300 initiated by an operator, each with different training data sets Z, which may cause problems for the fault detection system 54.

Generally, the multiple system matrix training sequence iterations 400 illustrates a scenario intended to accommodate the smaller data sets in a process control system by following the training sequence described in FIGS. 3A and 3B. The system matrix determination module 64 may receive multiple training data sets $Z_1$-$Z_Y$, wherein each of the multiple training data sets $Z_1$-$Z_Y$ may be descriptive of normal operating conditions of a process in a unique operating state or time of day. The system matrix determination module 64 may apply the system matrix training sequence 300 to each of the multiple training data sets $Z_1$-$Z_Y$, and may generate multiple final system matrices $D_{f,1}$-$D_{f,Y}$. Accordingly, the system matrix determination module 64 may store each of the multiple final system matrices $D_{f,1}$-$D_{f,Y}$ in memory (e.g., memory 42) to create a final system matrix database the fault detection system 54 may use to accurately estimate values corresponding to on-line data Y. For example, the process estimation model 66 may receive the on-line data Y from the process control system 50, determine an operating state of the process 58 by analyzing the values of the on-line data Y, and access the final system matrix database to retrieve one of the multiple final system matrices $D_{f,1}$-$D_{f,Y}$ that corresponds to the operating state of the process 58 to use in the MSET.

However, in situations where a process plant (e.g., plant 10) has a large number of operating states or an engineer/operator initiates a large number of system matrix training sequences 300, the number of matrices included in the final system matrix database may itself cause problems. More specifically, the fault detection system 54 may determine during on-line execution of the fault determination protocols that the protocols are exceeding a predetermined time threshold, that the number of stored system matrices has exceeded a predetermined threshold, and/or that the fault detection system 54 is otherwise operating too inefficiently to process the on-line data Y.

In response, the fault detection system 54 may generate an alert signal A incorporating this inefficiency information, and the alert signal A may include an instruction to aggregate the multiple final system matrices $D_{f,1}$-$D_{f,Y}$, or the process controller 56 or operator (via the user interface 60) may generate a signal (X, Z) including an instruction to that effect. Generally, an aggregate system matrix created as a result of aggregating the multiple final system matrices $D_{f,1}$-$D_{f,Y}$ into a single system matrix may include the characteristics of each of the respective training data sets $Z_1$-$Z_Y$ used to create the multiple final system matrices $D_{f,1}$-$D_{f,Y}$. However, simply aggregating all of the multiple final system matrices $D_{f,1}$-$D_{f,Y}$ into a single system matrix may create similar inefficiency problems as maintaining the multiple final system matrices $D_{f,1}$-$D_{f,Y}$ because the overall amount of data has not changed. To accommodate the limited memory capacity and preserve the characteristics of all training data sets, the training system 52 may perform the system matrix training sequence 300 with the multiple final system matrices $D_{f,1}$-$D_{f,Y}$ serving as the training data set. In this manner, the aggregate system matrix may define the boundaries of "normal" process operating conditions across the training data sets of all of the multiple final system matrices $D_{f,1}$-$D_{f,Y}$ by including a minimally sufficient amount of data from the multiple final system matrices $D_{f,1}$-$D_{f,Y}$.

Figure 4B:
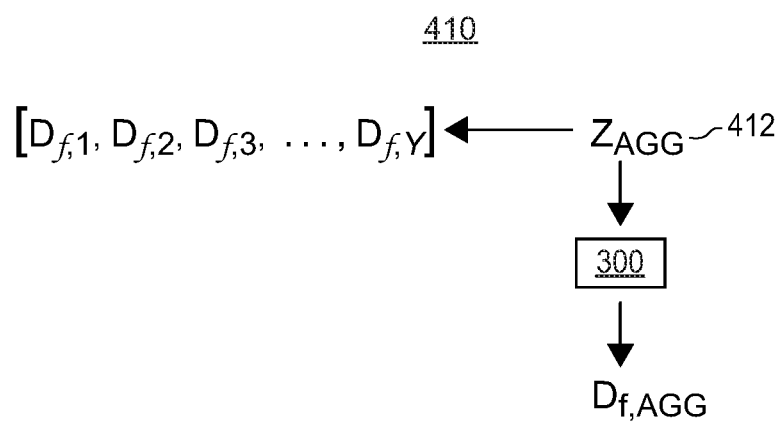
FIG. 4B is a flow diagram of an improved training technique generating an aggregate system matrix for use in a fault detection system to detect the existence of faults in the operation of a process plant.

Accordingly, in response to an alert signal (e.g., alert signal A), or at the request of an engineer/operator, an engineer/operator may initiate an aggregate system matrix training sequence 410, as illustrated in FIG. 4B. Generally, the aggregate system matrix training sequence 410 generates an aggregate final system matrix $D_{f,agg}$ for use in a fault detection system to detect faults in the operation of a process. The aggregate system matrix sequence 410 generally includes performing the system matrix training sequence 300 using an aggregate training data set $Z_{agg}$ that includes each of the multiple final system matrices $D_{f,1}$-$D_{f,Y}$ to generate an aggregate final system matrix $D_{f,agg}$. More specifically, the system matrix determination module 64 may access the final system matrix database to generate the aggregate training data set $Z_{agg}$ by including all of the multiple final system matrices $D_{f,1}$-$D_{f,Y}$ into an aggregate matrix 412. The system matrix determination module 64 then applies the system matrix training sequence 300 to the aggregate training data set $Z_{agg}$, and generates the aggregate final system matrix $D_{f,agg}$. The system matrix determination module 64 may subsequently transmit the aggregate final system matrix $D_{f,agg}$ to the fault detection system 54 for use in the fault detection process, as described with reference to FIG. 2.

In this manner, the aggregate system matrix training sequence 410 of FIG. 4B may alleviate the processing and storage burdens on the training system 52 and fault detection system 54 resulting from large amounts of data. Each of the multiple final system matrices $D_{f,1}$-$D_{f,Y}$ maintain the characteristics of the respective training data sets $Z_1$-$Z_Y$ used to create the multiple final system matrices $D_{f,1}$-$D_{f,Y}$, when the matrices $D_{f,1}$-$D_{f,Y}$ are generated through the MSET. As a result, when the multiple final system matrices $D_{f,1}$-$D_{f,Y}$ are combined to create the aggregate training data set $Z_{agg}$ that is then used to generate the aggregate final system matrix $D_{f,agg}$, the aggregate final system matrix $D_{f,agg}$ includes the important characteristics of all training data sets $Z_1$-$Z_Y$. Thus, a voluminous number of "normal" operating conditions of the process are encapsulated in this single aggregate final system matrix $D_{f,agg}$, which reduces the disk space requirements of the internal memory 42, and increases the speed of the training system 52 and fault detection system 54 by minimizing the data requirements for real-time computations.

When implemented, any of the simulation software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A system for detecting faults in the operation of a process, comprising:
   a process controller coupled to the process for controlling the process;
   a user interface coupled to the process controller, configured to receive a set of error thresholds and a maximum system matrix size from an operator;
   a fault detection system for detecting faults in the operation of the process, wherein the fault detection system is configured to:
     determine an estimated vector by applying a multivariate state estimation technique (MSET) using a final system matrix and the set of error thresholds to a set of on-line data from the process, and
     produce an alert signal indicative of a fault in the operation of the process by comparing the estimated vector to the set of on-line data; and
   a training system communicatively coupled to the process controller, the user interface, and the fault detection system for generating a system matrix, wherein the training system is configured to:
     (a) generate an initial system matrix using a training data set including a plurality of training data set vectors,
     (b) designate the initial system matrix as a current system matrix,
     (c) calculate a set of estimated vectors using the current system matrix in the MSET and the training data set,
     (d) determine a root-mean-squared (RMS) error and a maximum error for each process variable in the training data set by comparing the set of estimated vectors to the training data set,
     (e) identify a first process variable with an RMS error greater than a corresponding error threshold,
     (f) store a first training data set vector that includes the maximum error for the first process variable in the current system matrix,
     (g) iteratively perform steps (c)-(g) until the RMS error of each process variable does not exceed the corresponding error threshold or a size of the current system matrix exceeds the maximum system matrix size,
     (h) designate the current system matrix as a final system matrix, and
     (i) transmit the final system matrix and the set of error thresholds to the fault detection system.

2. The system of claim 1, wherein the initial system matrix includes (i) a minimum training data set vector that includes a minimum value in the training data set of at least one of the process variables and (ii) a maximum training data set vector that includes a maximum value in the training data set of at least one of the process variables.

3. The system of claim 2, wherein the user interface is further configured to receive a dominant variable designation from the operator indicating a dominant variable of the process, and wherein (i) the minimum training data set vector includes the minimum value of the dominant variable and (ii) the maximum training data set vector includes the maximum value of the dominant variable.

4. The system of claim 1, wherein comparing the set of estimated vectors to the training data set includes subtracting each training data set vector from a corresponding estimated vector to calculate a respective error corresponding to each process variable of each training data set vector.

5. The system of claim 4, wherein determining the maximum error for each process variable includes comparing the absolute value of the respective training error for the process variable in each training data set vector.

6. The system of claim 1, wherein the training data set is a plurality of final system matrices.

7. The system of claim 1, wherein the on-line data includes a plurality of on-line data vectors, and wherein the fault detection system is configured to:
   determine one or more RMS errors by comparing each on-line data vector to a corresponding estimated vector;
   identify a fault RMS error that exceeds a corresponding RMS error threshold;
   generate the alert signal corresponding to the fault RMS error; and
   transmit the alert signal to the user interface.

8. The system of claim 1, wherein the training data set does not include a state variable indicating an operating state of the process, and wherein each training data set vector is indicative of a normal operating condition of the process.

9. A method of training a fault detection system for detecting faults in an operation of a process within a process plant, the method comprising:
   receiving, from a process controller, a training data set including one or more training data set vectors;
   receiving, from a user interface, a set of error thresholds and a maximum system matrix size;
   determining a final system matrix by:
     (a) generating an initial system matrix using the training data set,
     (b) designating the initial system matrix as a current system matrix, (c) calculating a set of estimated vectors using the current system matrix in a multivariate state estimation technique (MSET) and the training data set, (d) determining a root-mean-squared (RMS) error and a maximum error for each process variable in the training data set by comparing the set of estimated vectors to the training data set, (e) identifying a first process variable with an RMS error greater than a corresponding error threshold, (f) storing a first training data set vector that includes the maximum error for the first process variable in the current system matrix, (g) iteratively performing steps (c)-(g) until the RMS error of each process variable does not exceed the corresponding error threshold or a size of the current system matrix exceeds the maximum system matrix size, and (h) designating the current system matrix as a final system matrix; and updating a process estimation model by incorporating the final system matrix and the set of error thresholds.

10. The method of claim 9, wherein the initial system matrix includes (i) a minimum training data set vector that includes a minimum value in the training data set of at least one of the process variables and (ii) a maximum training data set vector that includes a maximum value in the training data set of at least one of the process variables.

11. The method of claim 10, further comprising:
receiving, from the user interface, a dominant variable designation indicating a dominant variable of the process, and
wherein (i) the minimum training data set vector includes the minimum value of the dominant variable and (ii) the maximum training data set vector includes the maximum value of the dominant variable.

12. The method of claim 9, wherein comparing the set of estimated vectors to the training data set includes subtracting each training data set vector from a corresponding estimated vector to calculate a respective error corresponding to each process variable of each training data set vector.

13. The method of claim 12, wherein determining the maximum error for each process variable includes comparing the absolute value of the respective training error for the process variable in each training data set vector.

14. The method of claim 9, wherein the training data set is a plurality of final system matrices.

15. The method of claim 9, further comprising:
receiving, from the process, an on-line data vector;
determining an estimated vector by applying the MSET using the final system matrix;
determining an RMS error for each process variable of the on-line data vector by comparing the on-line data vector to the estimated vector;
identifying a fault RMS error that exceeds a corresponding error threshold;
generating an alert signal corresponding to the fault RMS error; and
transmitting the alert signal to the user interface for display to an operator.

16. The method of claim 9, wherein the training data set does not include a state variable indicating an operating state of the process, and wherein each training data set vector is indicative of a normal operating condition of the process.

17. A fault detection training system for use in detecting faults in an operation of a process, comprising:

a fault detection system for detecting faults in the operation of the process, wherein the fault detection system is configured to:
determine an estimated vector by applying a multivariate state estimation technique (MSET) using a final system matrix and a set of error thresholds to a set of on-line data from the process, and
produce an alert signal indicative of a fault in the operation of the process by comparing the estimated vector to the set of on-line data; and a training system communicatively coupled to the fault detection system for generating a system matrix, wherein the training system is configured to:
(a) generate an initial system matrix using a training data set including a plurality of training data set vectors,
(b) designate the initial system matrix as a current system matrix,
(c) calculate a set of estimated vectors using the current system matrix in the MSET and the training data set,
(d) determine a root-mean-squared (RMS) error and a maximum error for each process variable in the training data set by comparing the set of estimated vectors to the training data set,
(e) identify a first process variable with an RMS error greater than a corresponding error threshold,
(f) store a first training data set vector that includes the maximum error for the first process variable in the current system matrix,
(g) iteratively perform steps (c)-(g) until the RMS error of each process variable does not exceed the corresponding error threshold or a size of the current system matrix exceeds a maximum system matrix size,
(h) designate the current system matrix as a final system matrix, and
(i) transmit the final system matrix and a set of error thresholds to the fault detection system.

18. The fault detection training system of claim 17, wherein the initial system matrix includes (i) a minimum training data set vector that includes a minimum value in the training data set of at least one of the process variables and (ii) a maximum training data set vector that includes a maximum value in the training data set of at least one of the process variables.

19. The fault detection training system of claim 18, wherein (i) the minimum training data set vector includes the minimum value of a dominant variable of the process and (ii) the maximum training data set vector includes the maximum value of the dominant variable of the process.

20. The fault detection training system of claim 17, wherein comparing the set of estimated vectors to the training data set includes subtracting each training data set vector from a corresponding estimated vector to calculate a respective error corresponding to each process variable of each training data set vector.

21. The fault detection training system of claim 20, wherein determining the maximum error for each process variable includes comparing the absolute value of the respective training error for the process variable in each training data set vector.

22. The fault detection training system of claim 17, wherein the training data set is a plurality of final system matrices.

23. The fault detection training system of claim 17, wherein the on-line data includes a plurality of on-line data vectors, and wherein the fault detection system is configured to:
  determine one or more RMS errors by comparing each on-line data vector to a corresponding estimated vector;
  identify a fault RMS error that exceeds a corresponding RMS error threshold;
  generate the alert signal corresponding to the fault RMS error; and
  transmit the alert signal to a user interface for display to an operator.

24. The fault detection training system of claim 17, wherein the training data set does not include a state variable indicating an operating state of the process, and wherein each training data set vector is indicative of a normal operating condition of the process.

25. A method of training a fault detection system for detecting faults in an operation of a process within a process plant, the method comprising:
  receiving, from a process controller, a plurality of training data sets each including one or more training data set vectors;
  receiving, from a user interface, a set of error thresholds and a maximum system matrix size;
  determining an aggregate final system matrix by:
  (a) generating an initial system matrix using a respective training data set from the plurality of training data sets,
  (b) designating the initial system matrix as a current system matrix,
  (c) calculating a set of estimated vectors using the current system matrix in a multivariate state estimation technique (MSET) and the respective training data set,
  (d) determining a root-mean-squared (RMS) error and a maximum error for each process variable in the respective training data set by comparing the set of estimated vectors to the respective training data set,
  (e) identifying a first process variable with an RMS error greater than a corresponding error threshold,
  (f) storing a first respective training data set vector that includes the maximum error for the first process variable in the current system matrix,
  (g) iteratively performing steps (c)-(g) until the RMS error of each process variable does not exceed the corresponding error threshold or a size of the current system matrix exceeds the maximum system matrix size,
  (h) designating the current system matrix as a final system matrix,
  (i) iteratively performing steps (a)-(i) until a respective final system matrix is designated for each respective training data set of the plurality of training data sets,
  (j) generating an aggregate training data set including each respective final system matrix,
  (m) performing steps (a)-(h) with the aggregate training data set until the RMS error of each process variable does not exceed the corresponding error threshold or a size of the current system matrix exceeds the maximum system matrix size, and
  (n) designating the final system matrix as the aggregate final system matrix; and
  updating a process estimation model by incorporating the aggregate final system matrix and the set of error thresholds.

* * * * *

UNITED STATES PATENT AND TRADEMARK OFFICE
CERTIFICATE OF CORRECTION

Page 1 of 2

PATENT NO. : 11,449,044 B2
APPLICATION NO. : 16/851449
DATED : September 20, 2022
INVENTOR(S) : Xu Cheng It is certified that error appears in the above-identified patent and that said Letters Patent is hereby corrected as shown below:

In the Drawings

At Fig. 3A, Sheet 3 of 5, Tag "308", Line 1, "$x_{mix,d}$]" should be -- $x_{min,d}$] --.

At Fig. 3B, Sheet 4 of 5, Tag "330", Line 1, "$x_{mix,d}$," should be -- $x_{min,d}$, --.

In the Specification

At Column 2, Line 51, "to a" should be -- a --.

At Column 6, Line 3, "into the" should be -- in the --.

At Column 7, Lines 62-63, "DESCRIPTION" should be -- DETAILED DESCRIPTION --.

At Column 9, Line 39, "to a" should be -- a --.

At Column 12, Line 37, "exchanges," should be -- exchangers, --.

At Column 13, Line 52, "into" should be -- in --.

At Column 19, Line 50, "reached" should be -- reached. --.

At Column 21, Line 15, "(IVO" should be -- ($PV_1$) --.

At Column 24, Line 16, "matrix" should be -- matrix is --.

Signed and Sealed this
Third Day of February, 2026

John A. Squires
*Director of the United States Patent and Trademark Office*

In the Claims

At Column 30, Line 23, "(m)" should be -- (k) --.

At Column 30, Line 28, "(n)" should be -- (l) --.